US 6,688,610 B2

(12) United States Patent
Huggins et al.

(10) Patent No.: US 6,688,610 B2
(45) Date of Patent: Feb. 10, 2004

(54) CHUCK WITH QUICK CHANGE

(75) Inventors: Mark S. Huggins, Clemson, SC (US); Stephen W. Steadings, Seneca, SC (US); James L. Weinhold, Minnetonka, MN (US); William C. Buck, Clemson, SC (US)

(73) Assignee: Power Tool Holders Incorporated, Christiana, DE (US)

( * ) Notice: Subject to any disclaimer, the term of this patent is extended or adjusted under 35 U.S.C. 154(b) by 0 days.

(21) Appl. No.: 09/852,936

(22) Filed: May 10, 2001

(65) Prior Publication Data

US 2002/0063401 A1 May 30, 2002

Related U.S. Application Data

(60) Provisional application No. 60/203,713, filed on May 12, 2000.

(51) Int. Cl.[7] .................. B23B 31/107; B23B 31/12
(52) U.S. Cl. .................. 279/22; 279/61; 279/62; 279/82; 279/14; 279/137; 279/902; 279/904
(58) Field of Search .................. 279/24, 29, 37, 279/60–62, 82, 902, 904, 906, 137, 14, 22, 905, 123, 74–76, 30

(56) References Cited

U.S. PATENT DOCUMENTS

| 549,837 | A | | 11/1895 | Weir |
|---|---|---|---|---|
| 553,531 | A | | 1/1896 | Long |
| 1,138,465 | A | | 5/1915 | Fegley |
| 1,195,214 | A | * | 8/1916 | Hapgood .................. 279/61 |
| 1,209,572 | A | | 12/1916 | Fegley et al. |
| 1,509,061 | A | | 9/1924 | Hardwicke |
| 1,653,762 | A | | 12/1927 | Fegley et al. |
| 1,705,275 | A | | 3/1929 | Neudeck |
| 2,027,486 | A | | 1/1936 | Lapointe |
| 2,158,728 | A | | 5/1939 | Peters |
| 2,336,095 | A | | 12/1943 | Heding |
| 2,550,871 | A | * | 5/1951 | Sharp .................. 279/61 |
| 2,806,706 | A | | 9/1957 | Fitch |
| 2,807,473 | A | | 9/1957 | Kiehne |
| 2,890,072 | A | | 6/1959 | Kaman et al. |
| 2,926,020 | A | | 2/1960 | Dayton et al. |
| 3,219,355 | A | | 11/1965 | Fujinuma |
| 3,251,605 | A | | 5/1966 | Ondeck |
| 3,260,541 | A | | 7/1966 | Sadler et al. |
| 3,367,727 | A | | 2/1968 | Ward et al. |
| 3,398,965 | A | | 8/1968 | Cox |
| 3,521,895 | A | | 7/1970 | Smith |
| 3,529,842 | A | | 9/1970 | Benjamin et al. |
| 3,549,160 | A | | 12/1970 | Etzkorn |
| 3,582,097 | A | | 6/1971 | Elliott, Jr. |
| 3,583,715 | A | | 6/1971 | Jahri |
| 3,658,351 | A | | 4/1972 | Benjamin et al. |
| 3,693,484 | A | | 9/1972 | Sanderson, Jr. |

(List continued on next page.)

FOREIGN PATENT DOCUMENTS

| CH | 314718 | A | * | 8/1956 | .................. 279/61 |
|---|---|---|---|---|---|
| GB | 2065001 | | | 6/1981 | |
| WO | 0071287 | | | 11/2000 | |

OTHER PUBLICATIONS

United Kingdom Search Report of Oct. 23, 2001.

*Primary Examiner*—Steven C. Bishop
(74) *Attorney, Agent, or Firm*—Nelson Mullins Riley & Scarborough, LLP (57) ABSTRACT

A chuck includes a generally cylindrical body and a plurality of jaws reciprocally disposed in the body in communication with a central bore in the body. A first detent extends radially into the central bore and is releasable in a radially outward direction. Upon insertion of an elongated tool shaft having a polygonal cross section into the bore so that a groove in the tool shaft is aligned with the first detent, the first detent engages the groove and axially retains the tool shaft. Upon movement of the jaws so that the jaw faces engage flat sides of the tool shaft, the jaws rotationally retain the tool shaft.

33 Claims, 7 Drawing Sheets

U.S. PATENT DOCUMENTS

| | | |
|---|---|---|
| 3,707,303 A | 12/1972 | Petri |
| 3,726,533 A | 4/1973 | Lafferty, Sr. |
| 3,734,516 A | 5/1973 | Smith |
| 3,735,993 A | 5/1973 | Siebert |
| 3,767,218 A | 10/1973 | Linthicum et al. |
| 3,861,693 A | 1/1975 | Huber |
| 3,893,677 A | 7/1975 | Smith |
| 3,924,493 A | 12/1975 | Penner |
| 3,929,343 A | 12/1975 | Wanner et al. |
| 3,945,653 A | 3/1976 | Falchle |
| 4,002,347 A | 1/1977 | Wanner et al. |
| 4,041,729 A | 8/1977 | Bilz |
| 4,107,949 A | 8/1978 | Wanner et al. |
| 4,131,165 A | 12/1978 | Wanner et al. |
| 4,184,692 A | 1/1980 | Benson et al. |
| 4,209,182 A | 6/1980 | Sheldon |
| 4,231,581 A | 11/1980 | Benedict |
| 4,234,277 A | 11/1980 | Benson et al. |
| 4,287,923 A | 9/1981 | Hornung |
| 4,290,617 A | 9/1981 | Yoshida |
| 4,309,042 A | 1/1982 | Fauth et al. |
| 4,349,929 A | 9/1982 | Dewey |
| 4,378,053 A | 3/1983 | Simpson |
| 4,390,311 A | 6/1983 | Kuhlmann |
| 4,407,615 A | 10/1983 | Kuhlmann |
| RE31,755 E | 12/1984 | Wanner et al. |
| 4,491,444 A | 1/1985 | Rumpp et al. |
| 4,573,839 A | 3/1986 | Finnegan |
| 4,594,036 A | 6/1986 | Hogenhout |
| 4,626,152 A | 12/1986 | Palm |
| 4,629,375 A | 12/1986 | Lieser |
| 4,644,831 A | 2/1987 | Yang |
| 4,688,975 A | 8/1987 | Palm |
| 4,692,073 A | 9/1987 | Martindell |
| 4,726,270 A | 2/1988 | Lucas |
| 4,740,122 A | 4/1988 | Glaser |
| 4,775,159 A * | 10/1988 | Manschitz .................. 279/62 |
| 4,775,269 A | 10/1988 | Brix |
| 4,787,278 A | 11/1988 | Bononi |
| 4,824,298 A | 4/1989 | Lippacher et al. |
| 4,848,779 A | 7/1989 | Wheeler et al. |
| 4,858,939 A | 8/1989 | Riggs |
| 4,900,202 A | 2/1990 | Wienhold |
| 4,934,226 A | 6/1990 | Dacey, Jr. |
| 4,960,344 A | 10/1990 | Geisthoff et al. |
| 5,011,344 A | 4/1991 | Johnson |
| 5,013,194 A | 5/1991 | Wienhold |
| 5,016,892 A | 5/1991 | Lafforgue et al. |
| 5,028,057 A | 7/1991 | Wanner |
| 5,062,749 A | 11/1991 | Sheets |
| 5,076,371 A | 12/1991 | Obermeier et al. |
| 5,188,378 A | 2/1993 | Erlenkeuser |
| 5,199,833 A | 4/1993 | Fehrle et al. |
| 5,301,961 A | 4/1994 | Wozar |
| 5,346,453 A | 9/1994 | Rivera-Bottzeck |
| 5,348,317 A | 9/1994 | Steadings et al. |
| 5,354,075 A | 10/1994 | Marik et al. |
| 5,398,946 A | 3/1995 | Quiring |
| 5,417,527 A | 5/1995 | Wienhold |
| 5,437,465 A | 8/1995 | Vögele et al. |
| 5,447,397 A | 9/1995 | Asano |
| 5,464,229 A | 11/1995 | Salpaka |
| 5,470,084 A * | 11/1995 | Reibetanz et al. ............ 279/62 |
| 5,481,949 A | 1/1996 | Yen |
| 5,558,478 A | 9/1996 | Odendahl et al. |
| 5,573,255 A | 11/1996 | Salpaka |
| 5,577,743 A | 11/1996 | Kanaan et al. |
| 5,603,516 A | 2/1997 | Neumaier |
| 5,669,730 A | 9/1997 | Bidaux |
| 5,678,961 A | 10/1997 | Fleege et al. |
| 5,700,018 A | 12/1997 | Bongers-Ambrosius et al. |
| 5,709,391 A | 1/1998 | Arakawa et al. |
| 5,709,393 A | 1/1998 | von Keudell et al. |
| 5,722,805 A | 3/1998 | Giffin |
| 5,755,448 A | 5/1998 | Kanaan et al. |
| 5,810,366 A | 9/1998 | Montjoy et al. |
| 5,813,296 A | 9/1998 | Hoff et al. |
| 5,820,136 A | 10/1998 | Han et al. |
| 5,826,888 A | 10/1998 | Weaver et al. |
| 5,833,405 A | 11/1998 | Nielsen |
| 5,868,209 A | 2/1999 | Wierspecker et al. |
| 5,881,614 A | 3/1999 | Cheng-Tsan |
| 5,893,685 A | 4/1999 | Olson et al. |
| 5,903,983 A | 5/1999 | Jungmann et al. |
| 5,906,378 A | 5/1999 | Nordquist |
| 5,921,562 A | 7/1999 | Robison |
| 5,921,563 A | 7/1999 | Huggins et al. |
| 5,934,384 A | 8/1999 | Wang |
| 5,947,484 A | 9/1999 | Huggins et al. |
| 5,951,026 A | 9/1999 | Harman, Jr. et al. |
| 5,954,347 A | 9/1999 | Buck et al. |
| 5,975,815 A | 11/1999 | Zierpka et al. |
| 5,984,596 A | 11/1999 | Fehrle et al. |
| 5,988,957 A | 11/1999 | Wheeler |
| 6,007,277 A | 12/1999 | Olson et al. |
| 6,047,971 A | 4/2000 | Harman, Jr. et al. |
| 6,053,675 A | 4/2000 | Holland et al. |
| 6,059,296 A | 5/2000 | Baeder |
| 6,079,716 A | 6/2000 | Harman, Jr. et al. |
| 6,089,798 A | 7/2000 | Wierspecker et al. |
| 6,092,814 A | 7/2000 | Kageler |
| 6,126,370 A | 10/2000 | Wheeler et al. |
| 6,135,462 A * | 10/2000 | Robison ..................... 279/137 |
| 6,193,242 B1 * | 2/2001 | Robison ..................... 279/137 |
| 6,260,857 B1 * | 7/2001 | Wienhold et al. ............. 279/62 |
| 6,554,292 B1 * | 4/2003 | Rohm ....................... 279/137 |

* cited by examiner

CHUCK WITH QUICK CHANGE

This application claims priority to U.S. Provisional Application No. 60/203,713, filed on May 12, 2000 the entire disclosure of which is incorporated by reference herein.

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screw drivers, nut drivers, burrs, mounted grinding stones, and other cutting or abrading tools. Since the tools may have shanks of varying diameter or may have a polygonal cross section, the device is usually provided with a chuck that is adjustable over a relatively wide range. The chuck may be attached to the driver by a threaded or tapered bore.

A wide variety of chucks have been developed in the art. In one form of chuck, three jaws spaced circumferentially approximately 120° apart from each other are constrained by angularly disposed passageways in a body attached to the drive shaft. The chuck is configured so that rotation of the body in one direction with respect to a constrained nut forces the jaws into or away from the gripping relationship with a tool shank. Such a chuck may be keyless if it can be tightened or loosened by manual rotation. Examples of such chucks are disclosed in U.S. Pat. Nos. 5,125,673 and 5,193,824, commonly assigned to the present assignee and the entire disclosures of which are incorporated by reference herein. Various configurations of keyless chucks are known in the art and are desirable for variety of applications.

Various quick change chuck devices are known in the art. One exemplary such device includes a body with a central bore that receives a bit having a polygonal cross-section. The body includes a groove extending transversely across the body and opening into the axial bore. The bit includes an annular groove at its rear end. A wire is disposed in the body groove so that when the bit is pushed into the bore, the bit pushes the wire radially outward. The wire is, however, biased radially inward. Thus, when the groove at the bit's rear end aligns with the wire, the wire moves into the bit groove to positively retain the bit in the chuck bore.

The chuck body includes a stem portion extending from its rear. The stem may be received in the bore of a three-jawed oblique chuck as described above so that the quick-change chuck is secured to the drill by the three-jawed chuck. Another quick-change device is disclosed in U.S. Pat. No. 5,947,484, the disclosure of which is incorporated by reference herein.

SUMMARY OF THE INVENTION

The present invention recognizes and addresses the foregoing considerations, and others, of prior art constructions and methods.

Accordingly, it is an object of the present invention to provide an improved chuck.

This and other objects may be achieved by a chuck for use with a manual or powered driver having a rotatable drive shaft. The chuck includes a generally cylindrical body having a nose section and a tail section. The tail section is rotatable with respect to the drive shaft, and the nose section has a central bore formed therein. A plurality of jaws are reciprocally disposed in the body in communication with the central bore. Each of the jaws has a jaw face formed on one side thereof. A first detent extends radially into the bore. The first detent is releasable in a radially outward direction. An elongated tool shaft has a polygonal cross section and defines a circumferential groove. Upon insertion of the tool shaft into the bore so that the groove is aligned with the first detent, the first detent engages the groove and axially retains the tool shaft. Upon movement of the jaws so that jaw faces engage flat sides of the tool shaft, the jaws rotationally retain the tool shaft.

The accompanying drawings illustrate one or more embodiments of the invention and, together with the description, serve to explain the principles of the invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

Figure 1:
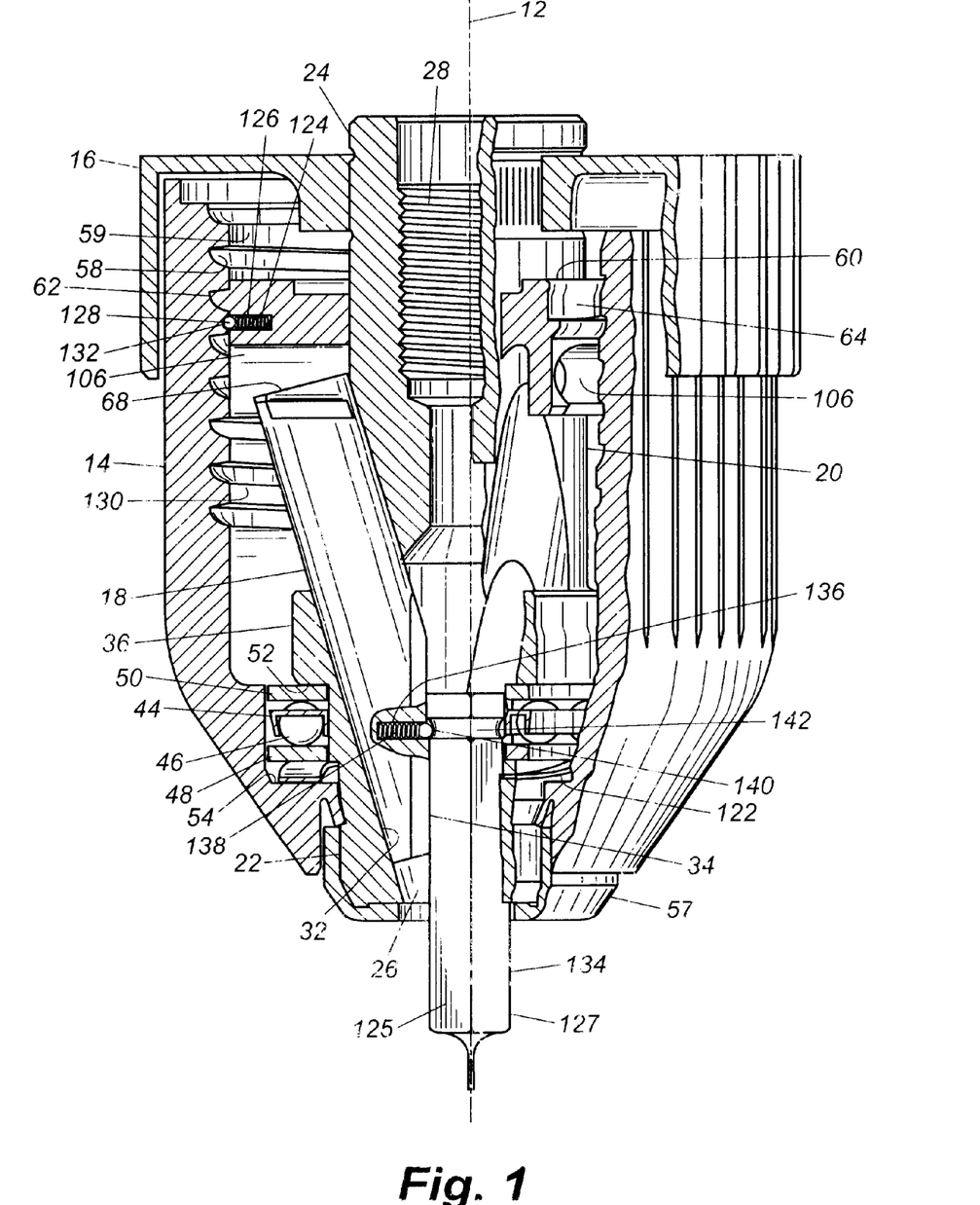
FIG. 1 is front plan view, partly in section, of a chuck in accordance with an embodiment of the present invention.
Figure 2:
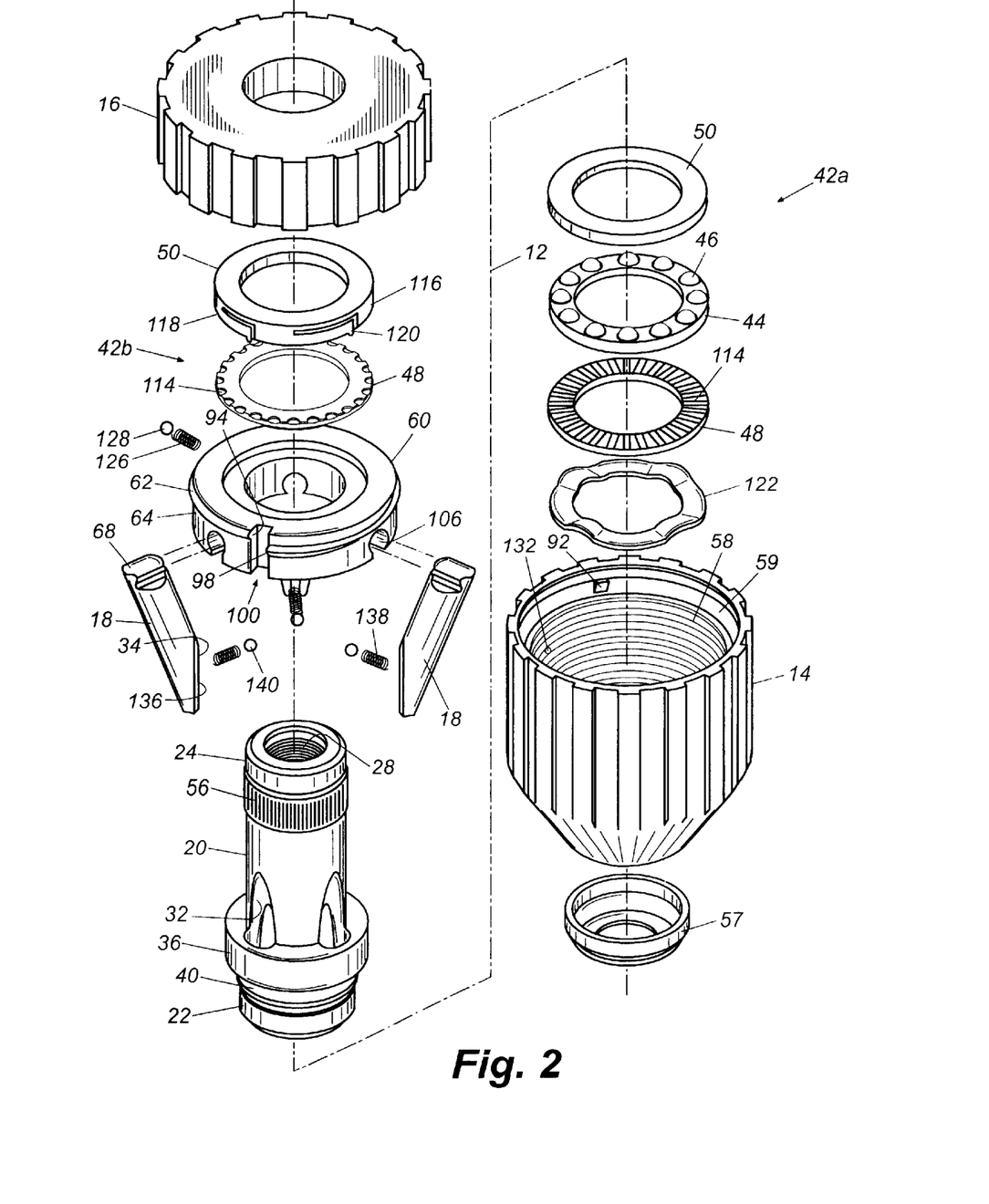
FIG. 2 is an exploded view of the chuck as in FIG. 1.

Referring generally to FIGS. 1 and 2, a chuck 10 in accordance with the present invention has a central longitudinal axis depicted by the dashed line designated at 12. Chuck 10 includes a front sleeve 14, a rear sleeve 16, and a plurality of jaws 18. A body 20 is generally cylindrical in shape and comprises a nose or forward section 22 and a tail or rearward section 24. An axial bore 26 is formed in the nose section and is somewhat larger than the largest tool shank that the chuck is designed to accommodate. As should be understood in this art, body 20 may be formed from steel bar stock or any other suitable material.

Body 20 defines a threaded bore 28 in its tail section. Bore 28 is of a standard size to mate with the drive shaft of a powered or hand driver (not shown). While a threaded bore 28 is illustrated, such bore could be replaced with a tapered bore of a standard size to mate with a tapered drive shaft. The bores 26 and 28 may communicate at a central region of body 20. The central region may be formed with a socket to accept a drive bit so that the body may be screwed onto to the spindle by the bit.

Body 20 also defines three passageways 32 to respectively accommodate the three jaws 18. In a three-jaw configuration, each passageway, and therefore each jaw, is separated from each adjacent passageway by an arc of approximately 120°. The longitudinal axes of passageways 32 and jaws 18 are angled with respect to the chuck's longitudinal axis 12 but intersect the chuck axis at a common point ahead of chuck body 20. Each jaw has a tool engaging face 34 that is generally parallel to axis 12.

Body 20 includes a thrust ring member 36, which in a preferred embodiment forms an integral part of the body. Although not presently preferred, the thrust ring may be a separate component from the body's main portion. A ledge 40 extending forward from thrust ring 36 receives a bearing assembly 42. The bearing assembly includes a bearing cage 44 enclosing bearing balls 46 that forwardly bear, with respect to chuck body 20, on a forward washer 48 and rearwardly bear on a rearward washer 50. Rearward race 50 abuts a shoulder surface 52 formed between the raised and ledge portions of thrust ring 36. Forward race 48 bears in an axially forward direction against a spring washer 122 that in turn bears against a shoulder 54 of sleeve 14. Bearing assembly 42 may comprise any suitable construction, for example a bearing assembly of the type described in U.S. Pat. No. 5,348,318, incorporated by reference herein.

Tail section 24 of body 20 can include a rear cylindrical portion having a knurled surface 56 thereon for receipt of rear sleeve 16. The rear sleeve may be pressed onto the knurled surface, or could be retained in place by press fit without knurling or by use of a key.

At the front end of the chuck, nose section 22 is beveled and is adapted to receive a nose piece 57 for restraining front sleeve 14 from forward axial movement with respect to the chuck body. Alternatively, a snap ring or other suitable mechanism may be used to axially restrain the sleeve. Nose piece 57 may be pressed onto nose section 22 or attached in any other suitable manner. Rearward axial movement of the sleeve on the body is prevented by thrust ring 36 through bearing assembly 42.

The outer circumferential surface of sleeve 14 may be knurled or may be provided with longitudinal ribs or other protrusions to enable the operator to grip it securely. The front and rear sleeves may be fabricated from a structural plastic such as polycarbonate, a filled polypropylene, for example glass filled polypropylene, or a blend of structural plastic materials. Other composite materials such as, for example, graphite filled polymerics could also be suitable in certain environments. Further, either sleeve may be constructed from suitable metals, such as steel. Moreover, as would be appreciated by one skilled in the art, the materials from which the chuck of the present invention is fabricated will depend on the end use of the chuck, and the above are provided by way of example only.

An interior surface 59 of sleeve 14 defines female threads 58. The threads are a modified square thread formation in an eight pitch configuration along the length of sleeve 14. It should be understood, however, that any suitable thread shape or formation may be employed, for example including a modified buttress thread. In one preferred embodiment, the squared interface between the outer surface and the back side of thread 58 is replaced by a curved surface.

A driving disk 60 includes a male thread 62 extending about an outer circumferential surface 64. Thread 62 has the same pitch as thread 58 so that when thread 62 is received by thread 58, relative rotation between sleeve 14 and driving disk 60 moves the driving disk axially within the sleeve. In particular where the driving disk is molded, thread 62 may have sloped sides, for example at an approximately 5° slope, extending from surface 64 to the thread's outer diameter.

Driving disk 60 includes three equiangularly spaced apart radial slots 106 extending entirely radially through the disk. Slots 106 are cylindrical in shape and may be formed by boring radially inward into the driving disk outer surface with a suitable boring tool. Jaw end sections 68 are formed in a cooperating semi-circular shape so that the slots 106 slideably receive the respective jaws. The slots allow the jaw ends to move radially as the driving disk moves the jaws between open and closed positions. A dry lubricant coating may be provided on the jaw ends and/or slots 106 to facilitate this movement. The cooperation between the jaw ends and slots 106 maintains the jaws at the proper angle with respect to the driving disk so that the jaws are maintained in alignment in the jaw passageways in the assembled chuck.

Rotation of sleeve 14 clockwise, when viewed from nose section 22, moves driving disk 60 axially forward with respect to the chuck axis, thereby moving jaws 18 to a closed position. Conversely, counter-clockwise rotation of the front sleeve moves the jaws in an opening direction. A stop 92 is provided at the rear edge of thread 58. When the jaws reach a fully open position, a rear edge 94 of thread 62 abuts stop 92. This prevents further rotation of the sleeve with respect to the driving disk. A similar stop (not shown) is provided at the front end of thread 58 to stop a forward edge 98 of thread 62 to prevent the jaws from binding in the fully closed position when there is no tool in the chuck bore.

Thread 62 defines one turn that extends slightly less than 360° around surface 64 of driving disk 60. A gap 100 between edges 94 and 98 has an angular width greater than the width of stop 92. This facilitates the chuck's assembly in that the driving disk may be placed directly down onto thread 58 over the stop. Rear sleeve 16 prevents the driving disk from disengaging from the sleeve when the chuck is in a fully open position in which rear thread edge 94 abuts stop 92.

Bearing assembly 42 may comprise any suitable construction. FIG. 2, for example, illustrates two bearing configurations 42a and 42b. In the embodiment indicated at 42a, the washer that forms bearing race 48 includes radially aligned recesses 114 in the washer's rearward face so that each of bearing balls 46 are received in a respective recess 114.

As it is rotated, sleeve 14 exerts a relative rotational force between races 48 and 50. Normally, washer 48 carries balls 46 so that cage 44 rotates with washer 48. Before the jaws close onto the tool, however, there is relatively little rearward axial force against washer 50. Thus, balls 46 slide against the washer, which remains in position against the chuck body. Where the frictional force between balls 46 and washer 50 is greater than that between sleeve 14 and washer 48 through spring 122, the entire bearing assembly remains rotationally held to the body as the sleeve rotates.

When the jaws close onto a tool shank, driving disk 60 exerts rearward axial force against sleeve 14, which in turns translates this force to the body through spring 122 and bearing 42*a*. At this point, the increased frictional force between balls 46 and race 50 causes the balls to rotate against the washer, which is rotational held by friction to thrust ring 36. Since sleeve 14 rotationally drives washer 48 by friction through spring washer 122, this causes balls 46 to roll out of their recesses 114 into the next recess. Continued rotation of sleeve 14 continues movement of the balls through successive recesses, causing a clicking sound that notifies the operator that the chuck is approaching a fully tightened position.

In another embodiment, bearing 42*b* includes a first race 48 having recesses 114 defined about the radially outward edge of its rearward face. Opposite race 50 includes a shroud 116 extending axially forward therefrom. The shroud defines a plurality of spring arms 118 biased axially forward toward washer 48 so that tabs 120 defined at the distal ends of arms 118 engage respective recesses 114. Thus, as sleeve 14 is rotated to a closed position, races 48 and 50 are rotationally linked to each other and rotate either with sleeve 14 or chuck body 20, depending on whether the sleeve or the body exerts the greater frictional force on the bearing assembly. As should be understood by those skilled in the art, this depends on the dimensions of the components and the materials from which they are made. When the chuck jaws tighten onto a tool shank, however, frictional forces between washer 48 and sleeve 14 through spring washer 122, and between washer 50 and thrust ring 36, overcome the link between washer 48 and 50. Further rotation of sleeve 14 therefore rotates washer 48 with respect to washer 50, overcoming the biasing force of spring arms 118. Thus, the arms are deflected so that each tab 120 moves out of its recess 114 into the next recess. Continued rotation of sleeve 14 moves tabs 120 in and out of successive recesses, creating a clicking sound notifying the user that the chuck is approaching a fully closed position.

Upon opening the chuck, having either bearing 42*a* or 42*b*, from a fully closed position, washers 48 and 50 initially rotate with respect to each other, again creating the clicking sound. As soon as the jaws release from the tool shank, however, the bearing assembly operates as described above prior to the fully closed position.

Driving disk 60 includes a blind bore 124 that extends radially inward from the driving disk's outer surface 64. A spring 126 biases a detent ball 128 radially outward from bore 124. As sleeve 14 rotates about the driving disk, ball 128 rides on lands 130 between the grooves of thread 58. A depression 132 is formed in the lands so that ball 128 moves into the depression when the jaws' tool engaging surfaces 34 define a predefined diameter. The diameter is slightly less than the cross width of a tool, preferably a multi-sided tool, which the chuck is to receive. In one preferred embodiment, for example, the diameter is slightly less than one-quarter inch. Ball 128 makes a clicking sound when entering depression 132 and slightly inhibits rotation of sleeve 14. This notifies the user that the jaws are in the predetermined position to receive the tool shank.

When the jaws are in the predetermined position, as located by the detent comprised of ball 128 and depression 132, a multi-sided bit 134 that is pushed into bore 26 against tool engaging surfaces 34 of jaws 18 pushes the jaws radially outward. This forces the jaws axially rearward in jaw passageways 32, thereby pushing driving disk 60 and sleeve 14 axially rearward on body 20 against the force of spring washer 122. When the bit is fully inserted into bore 26, spring 122 applies a forward bias to the jaws through sleeve 14 and driving disk 60 to retain the tool in the bore. The tool's flat sides 125, and their interfaces 127, generally prevent the tool's rotation within the bore.

Figure 3:
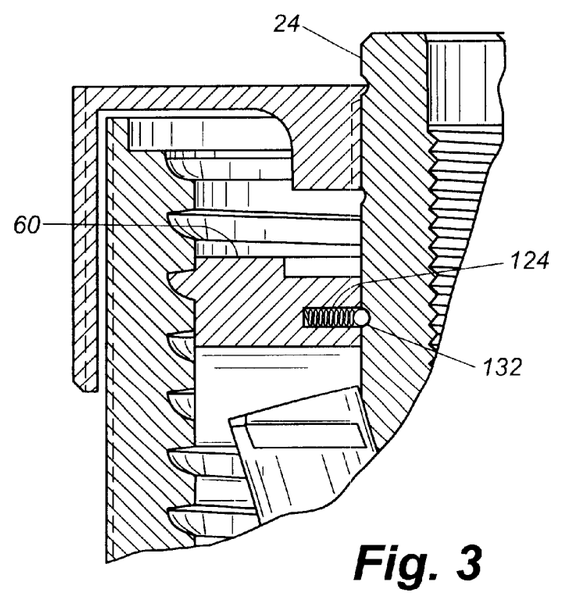
FIG. 3 is a partial sectional view of a chuck in accordance with an embodiment of the present invention.

It should be understood that various other locating mechanisms may be employed within the present invention. For example, referring to the embodiment shown partially in FIG. 3, bore 124 opens radially inward from driving disk 60. Depression 132 is located at a predetermined position in body tail section 24.

Figure 4:
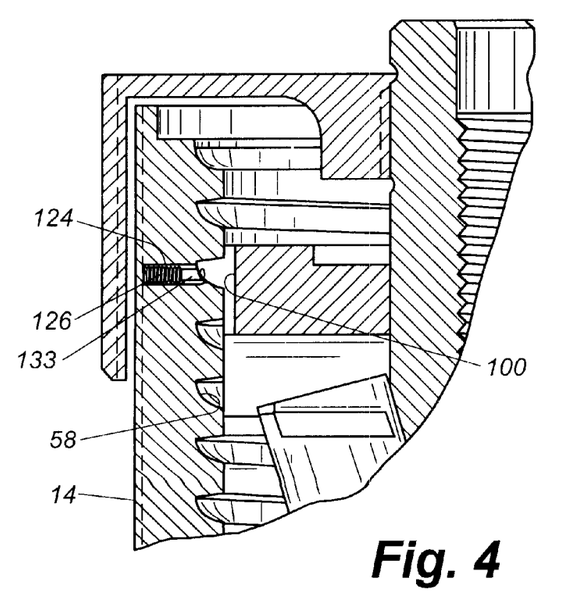
FIG. 4 is a partial sectional view of a chuck in accordance with an embodiment of the present invention.

In a still further embodiment, and referring to FIG. 4, bore 124 is located in sleeve 14 and opens radially inward to a groove of thread 58. Spring 126 biases a detent ball or pin 133 into the thread at predetermined position on the thread so that driving disk thread 62 (FIG. 2) engages pin 133 at the point where tool engaging jaw surfaces 34 (FIG. 2) define the predetermined diameter. Further rotation of sleeve 14 pushes pin 133 up into bore 124.

To release the bit in any of these embodiments, an operator pulls sleeve 14 axially rearward against the force of spring 122. This pulls driving disk 60, and therefore jaws 18, axially rearward, thereby releasing the bit.

Referring again to FIGS. 1 and 2, the chuck includes a positive locking mechanism to retain bit 134. For example, each jaw 18 may define a blind bore 136 extending radially inward from its tool engaging surface 34. A spring 138 biases a detent ball 140 radially inward. The mouth of bore 136 may be peened about its edge to create a lip that retains ball 140 in the bore. As bit 134 moves into bore 26, the bit's rear edge pushes ball 140 back into bore 136. As a groove 142 at the rear end of bit 134 reaches the bore, however, spring 138 pushes ball 140 into the groove, thereby positively retaining bit 134 axially in bore 26. To remove the bit, an operator pulls the bit axially forward so that the rear end of bit 134 pushes ball 140 back into bore 136.

Figure 5:
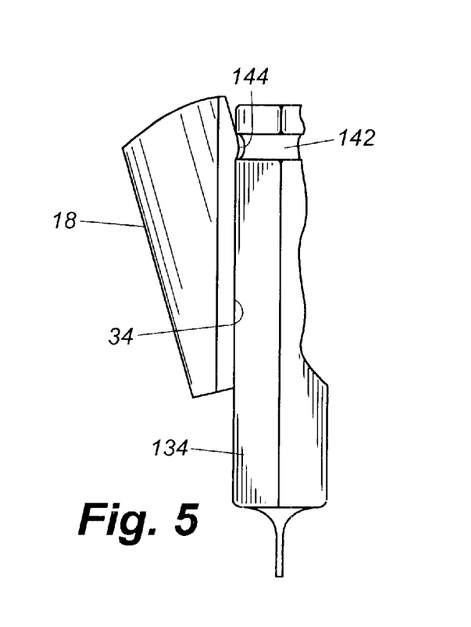
FIG. 5 is a partial perspective view of a jaw for use in a chuck in accordance with an embodiment of the present invention engaging a bit.

In another preferred embodiment, and referring to FIG. 5, a forward portion of the tool engaging surface 34 of each jaw 18 may be ground so that the tool engaging surface extends forward from a rear heel 144 defined at the rearward edge of the jaw face. The ground forward portion defines the predetermined diameter. As bit 134 is pushed into bore 26, the bit pushes jaws 18 radially outward so that the bit slides axially rearward along the jaw face. When groove 142 aligns with heel 144, the heel moves into the groove to positively retain the bit.

Figure 6:
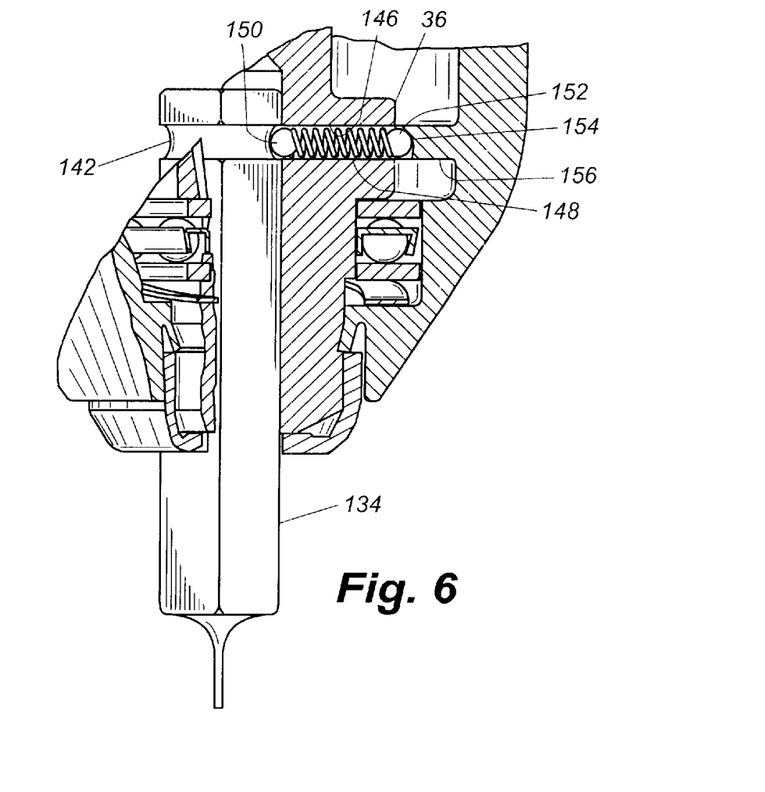
FIG. 6 is a partial sectional view of a chuck in accordance with an embodiment of the present invention.

In a still further embodiment illustrated in FIG. 6, a bore 146 is defined through thrust ring 36. A spring 148 extends between a detent ball 150 and a biasing ball 152. Normally, biasing ball 152 is pushed radially inward by a tapered surface 154 of an annular ring 156 attached to the inner surface of sleeve 14. As bit 134 is inserted into bore 26, the bit pushes ball 150 back into bore 146 until groove 142 aligns with the bore. At this point, ball 150 moves into groove 142 to positively retain the bit. As an operator pulls sleeve 14 rearward against spring 122, ring 156 also moves rearward, allowing ball 152 to ride radially outward against tapered surface 154. This partially relieves the pressure against ball 150, allowing the operator to more easily remove bit 134 from bore 26.

Accordingly, an operator may secure a tool, for example a bit having a circular cross-section, in chuck 10 by rotation of sleeve 14 to clamp jaws 18 onto the tool shank. Alternatively, the operator may rotate the sleeve until it reaches the predetermined position as indicated by the locator mechanism and thereafter insert and extract tools of a predetermined size against the biasing force provided by spring 122. This mode of operation is particularly suited to tool shanks having a polygonal cross-section. Thus, the chuck may be operated in a sleeve-tightening manner or in a quick-change manner.

Furthermore, it should be understood that the present invention may be employed in conjunction with various chuck configurations. For example, referring to FIGS. 7 and 8, chuck 10 includes a body 20, a nut 158, a nosepiece 57 and a plurality of jaws 18. Body 20 is generally cylindrical in shape and comprises a nose or forward section 22 and a tail or rearward section 24. The nose section defines an axial bore 26 that is somewhat larger than the largest tool shank that the chuck is designed to accommodate. A threaded bore 28 is formed in tail section 24 and is of a standard size to mate with the drive shaft of a powered or hand driver (not shown). The bores 26 and 28 may communicate at a central region of body 20. While a threaded bore 28 is illustrated, such bore could be replaced with a tapered bore of a standard size to mate with a tapered driveshaft.

Figure 7:
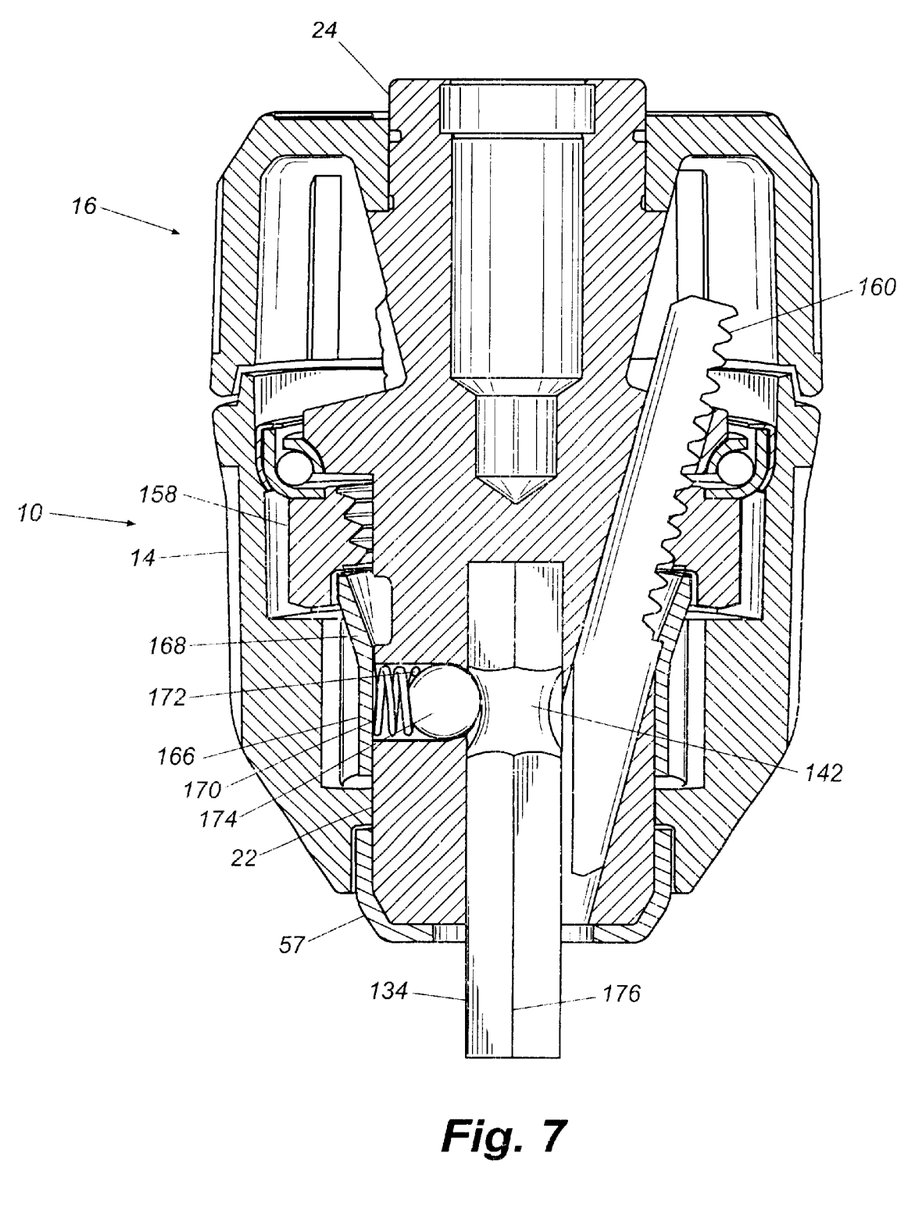
FIG. 7 is a plan view, in section, of a chuck in accordance with an embodiment of the present invention.
Figure 8:
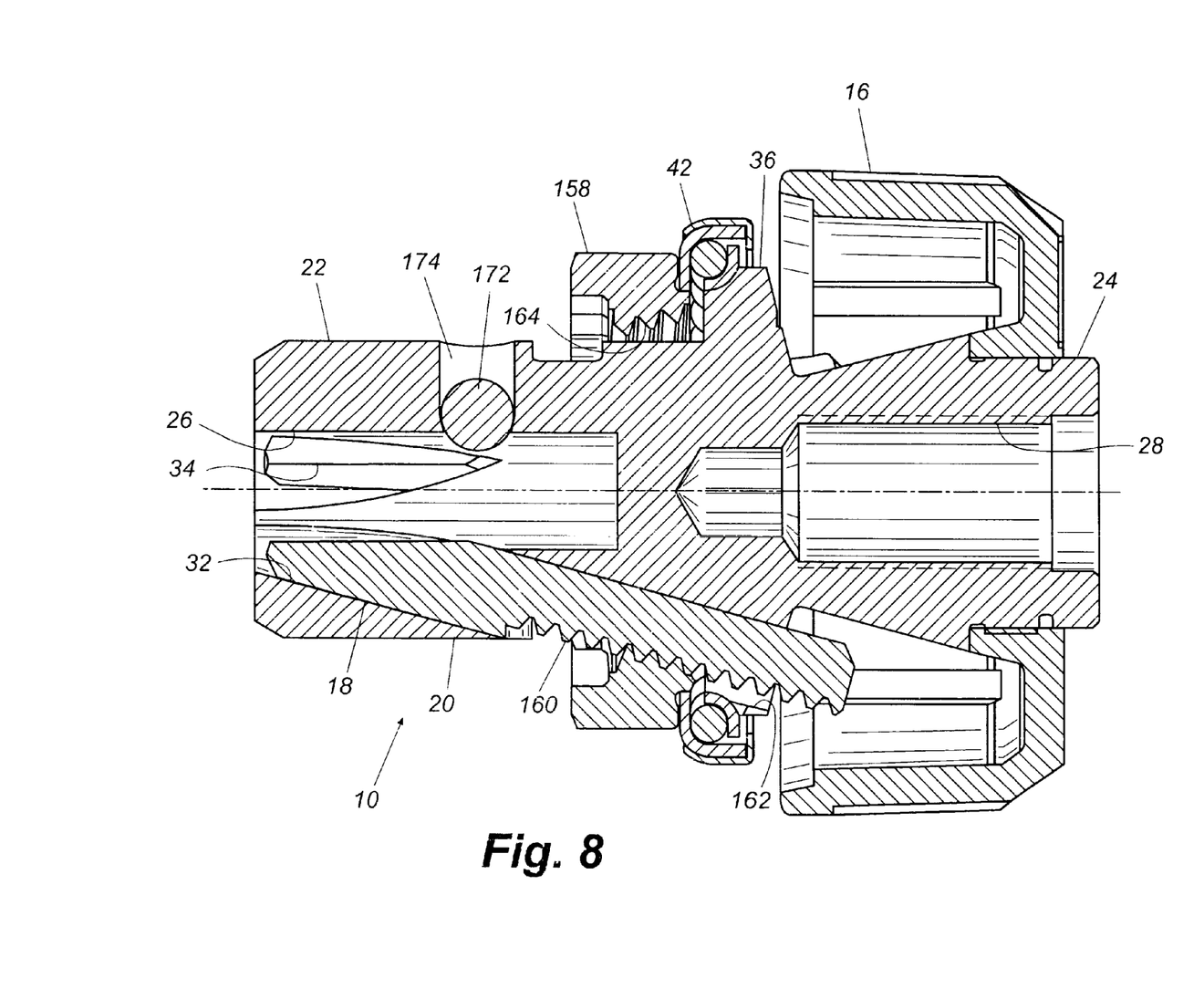
FIG. 8 is a partial sectional view of the chuck as in FIG. 7.

Body 20 defines three passageways 32 to accommodate the three jaws 18. Each jaw is separated from the adjacent jaw by an arc of approximately 120°. The axes of passageways 32 and jaws 18 are angled with respect to the chuck center axis such that each passageway axis travels through axial bore 26 and intersects the chuck axis at a common point ahead of the chuck body. The jaws form a grip that moves radially toward and away from the chuck axes to grip a tool, and each jaw 18 has a tool engaging face generally parallel to the chuck body axis. Threads 160, formed on each jaw's opposite or outer surface, may be constructed in any suitable type and pitch.

Body 20 includes a thrust ring 36 that includes a plurality of jaw guideways 162 formed around its circumference to permit retraction of the jaws therethrough and also includes a ledge portion to receive a bearing assembly 42.

Body tail section 24 includes a knurled surface that receives an optional rear sleeve 16 in a press fit. It should be understood, however, that the chuck, as well as the chucks described above, may be constructed with a single sleeve having no rear sleeve.

Chuck 10 includes a driving disk formed as a one piece nut 158 having threads 164 for mating with jaw threads 162. Nut 158 is positioned about the body in engagement with the jaw threads so that when the nut is rotated with respect to body 20, the jaws will be advanced or retracted depending on the nut's rotational direction.

The nut's forward axial face includes a plurality of recesses that receive corresponding drive dogs extending from the inner surface of front sleeve 14. Accordingly, sleeve 14 rotationally drives nut 158. Nosepiece 57 retains sleeve 14 against forward axial movement. Nosepiece 57 may be coated with a non-ferrous metallic coating to prevent rust and to enhance its appearance.

The outer circumferential surface of front sleeve 14 may be knurled or may be provided with longitudinal ribs or other protrusions to enable the operator to grip it securely. In like manner, the circumferential surface of rear sleeve 16, if employed, may be knurled or ribbed if desired.

A retainer 166 press fit to body 20 retains nut 158 in the axially forward direction. Retainer 166 includes a frusto-conical section 168 that facilitates movement of jaws 18.

In operation, an operator may close the chuck onto a tool shank by rotation of sleeve 14 so that jaws 18 move in passageways 32 to close upon the tool. Rotation of the sleeve in the opposite direction retracts the jaws from the tool, allowing the tool's removal from bore 26. Alternatively, the sleeve may be rotated so that the jaws are moved back to their fully retracted position as shown in FIG. 7, and a bit 134 may be retained in bore 26 by a quick-change mechanism including a spring 170 and detent ball 172 located within a bore 174 extending radially through body 20. Spring 170 extends between retainer 166 and ball 172 so that the spring biases the ball radially inward toward bore 26. Ball 172 is retained in bore 174 by a lip at the radially inward mouth of bore 174 that is formed, for example, in the drilling process or by peening the bore mouth. The diameter of the lip is such that a portion of ball 172 extends into bore 26 when spring 170 pushes the ball against the lip.

As an operator inserts bit 134 into bore 26, the bit's rear end pushes ball 172 back into bore 174 until an annular groove 142 at the bit's rear end aligns with the bore. At this point, spring 170 pushes ball 172 into groove 142 to positively retain bit 134 in the axial direction. In the fully open position, tool engaging surfaces 34 of jaws 18 define a predetermined diameter approximately equal to the width of bit 134. Thus, tool engaging surfaces 34 engage flat sides 176 of bit 134, thereby preventing its rotation.

Figure 9:
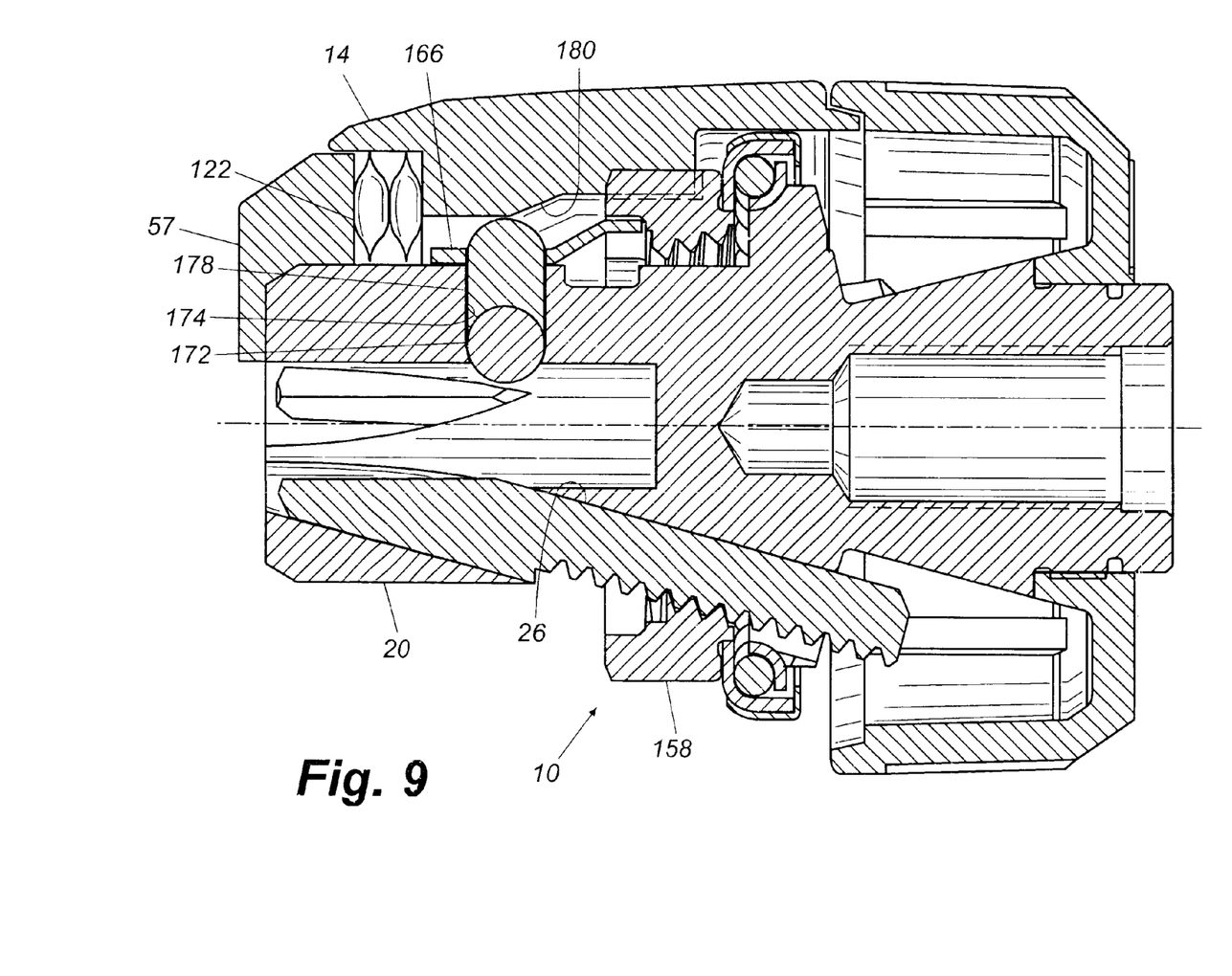
FIG. 9 is a partial sectional view of a chuck in accordance with an embodiment of the present invention.

In a still further embodiment illustrated in FIG. 9, one or more spring washers 122 are disposed between nosepiece 57 and front sleeve 14 so that the sleeve is axially reciprocal with respect to the body. The nut recesses and corresponding sleeve drive dogs permit the sleeve to move with respect to the nut as well. Bore 174 receives a detent ball 172 and a pin 178 that extends radially outward from bore 174 through a hole in retainer 166 so that an end of pin 178 abuts the inner surface of sleeve 14.

In the normal position of sleeve 14 shown in FIG. 9, the distal end of pin 178 abuts sleeve 14 at the radially inward edge of a tapered surface 180 so that the pin forces ball 172 into chuck bore 26. To insert a bit 134 (FIG. 7), an operator pushes sleeve 14 axially forward against the force of springs 122 so that tapered surface 180 aligns with the distal end of pin 178. As the operator then pushes the bit into bore 26, the bit's rear end pushes ball 172 back into bore 174 so that the distal end of pin 178 rides up tapered surface 180. When the bit is received in bore 26 such that the bit's annular groove 142 (FIG. 7) is aligned with bore 174, the operator releases sleeve 14. Springs 122 push the sleeve back to its position shown in FIG. 9 so that tapered surface 180 pushes pin 178 radially inward through bore 174 so that bit annular groove 142 (FIG. 7) receives ball 172 to axially retain the bit in bore 26.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal and equivalent scope of the appended claims.

What is claimed is:

1. A chuck for use with a manual or powered driver having a rotatable drive shaft, said chuck comprising:
   a generally cylindrical body having a nose section and a tail section, said tail section being rotatable with said drive shaft of said driver and said nose section having a central bore formed therein;
   a plurality of jaws reciprocally disposed in said body in communication with said central bore, each of said jaws having a jaw face formed on one side thereof;
   a first detent extending radially into said bore, said first detent being releasable in a radially outward direction; and
   an elongated tool shaft having a polygonal cross section and defining a circumferential groove,
   wherein, upon insertion of said tool shaft into said bore so that said groove is aligned with said first detent, said first detent engages said groove and axially retains said tool shaft, and
   wherein, upon movement of said jaws so that said jaw faces engage flat sides of said tool shaft, said jaws rotationally retain said tool shaft.

2. The chuck as in claim 1, wherein said nose section defines a plurality of angularly disposed passageways in communication with said central bore and wherein said jaws are respectively disposed in said passageways.

3. The chuck as in claim 2, including a driver in axial driving engagement with said jaws.

4. The chuck as in claim 1, including a spring disposed operatively between said body and said jaws so that said spring biases said jaws axially toward said central bore.

5. The chuck as in claim 1, wherein said first detent is defined in at least one of said jaws.

6. The chuck as in claim 1, wherein said first detent is defined in said body.

7. The chuck as in claim 1, including a second detent operatively disposed between said jaws and said body, and including a catch, said second detent and said catch being disposed with respect to each other so that said second detent engages said catch when said jaws are at a predetermined position at which said jaws engage said flat sides of said tool shaft when said tool shaft is inserted into said central bore.

8. A chuck for use with a manual or powered driver having a rotatable drive shaft, said chuck comprising:
   a generally cylindrical body having a nose section and a tail section, said tail section being rotatable with said drive shaft of said driver and said nose section having a central bore formed therein and a plurality of angularly disposed passageways formed therethrough and intersecting said axial bore;
   a generally cylindrical sleeve disposed rotatably about said body;
   a plurality of jaws slidably positioned in each of said angularly disposed passageways, each of said jaws having a jaw face formed on one side thereof;
   a nut disposed about said body in axially driving engagement with said jaws and rotatably with respect to one of said sleeve and said body so that relative rotation between said nut and said one of said sleeve and said body axially drives said jaws in said passageways;
   a first detent extending radially into said bore, said first detent being releasable in a radially outward direction; and
   an elongated tool shaft having a polygonal cross section and defining a circumferential groove,
   wherein, upon insertion of said tool shaft into said bore so that said groove is aligned with said first detent, said first detent engages said groove and axially retains said tool shaft, and
   wherein, upon movement of said jaws axially in said passageways so that said jaw faces engage flat sides of said tool shaft, said jaws rotationally retain said tool shaft.

9. The chuck as in claim 8, including a spring disposed operatively between said body and said jaws so that said spring biases said jaws axially forward in said passageways.

10. The chuck as in claim 9, wherein said first detent includes a ridge extending from said jaw face of at least one said jaw radially into said bore.

11. The chuck as in claim 8, wherein said first detent is defined in at least one of said jaws.

12. The chuck as in claim 11, wherein said at least one jaw defines a bore extending radially into said jaw from said jaw face, wherein said jaw bore defines a restricted opening at said jaw face, wherein said first detent includes a ball disposed in said jaw bore and a spring disposed in said jaw bore so that said spring biases said ball toward said restricted opening, and wherein the diameter of said ball is greater than the width of said restricted opening so that said ball extends outward of said jaw face when said ball engages said restricted opening.

13. The chuck as in claim 8, wherein said first detent is defined in said body.

14. The chuck as in claim 13, wherein said body defines a bore extending radially into said body from said central bore, wherein said radial bore defines a restricted opening at said central bore, wherein said first detent includes a first ball disposed in said radial bore and a spring disposed in said radial bore so that said spring biases said first ball toward said restricted opening, and wherein the diameter of said first ball is greater than the width of said restricted opening so that said first ball extends radially into said central bore when said first ball engages said restricted opening.

15. The chuck as in claim 14, wherein said radial bore extends through said body to an outer circumference of said body, wherein said detent includes a second ball disposed in said radial bore so that said spring is disposed between said first ball and said second ball, and wherein said second ball extends radially outward of said circumferential surface and engages an inner circumferential surface of said sleeve.

16. The chuck as in claim 15, wherein said inner circumferential surface defines a cam and wherein said sleeve is axially movably disposed on said body so that movement of said sleeve moves said cam against said second ball and thereby increases or releases pressure on said first ball through said spring, depending on the direction of said movement.

17. The chuck as in claim 8, including a second detent in operative communication between said jaws and said body, and including a catch, said second detent and said catch being disposed with respect to each other so that said second detent engages said catch when said jaws are at a predetermined position at which said jaws engage said flat sides of said tool shaft when said tool shaft is inserted into said central bore.

18. The chuck as in claim 8, wherein said nut includes a driving disk slidably disposed on said body and having an external screw thread, and wherein said sleeve defines an internal screw thread that meshes with said external screw thread whereby when said sleeve is rotated with respect to said body, said jaws are moved thereby.

19. The chuck as in claim 18, including a second detent disposed in one of said nut and said sleeve and a catch in the other of said sleeve and said nut, said second detent and said catch being disposed with respect to each other so that said second detent engages said catch when said jaws are at a predetermined position at which said jaws engage said flat sides of said tool shaft when said tool shaft is inserted into said central bore.

20. The chuck as in claim 19, wherein said catch is a depression defined in said other of said sleeve and said nut.

21. The chuck as in claim 18, including a second detent disposed in one of said nut and said body and a catch in the other of said nut and said body, said second detent and said catch being disposed with respect to each other so that said second detent engages said catch when said jaws are at a predetermined position at which said jaws engage said flat sides of said tool shaft when said tool shaft is inserted into said central bore.

22. The chuck as in claim 21, wherein said catch is a depression defined in said other of said nut and said body.

23. The chuck as in claim 8, wherein each of said jaws define threads thereon and wherein said nut defines threads that engage said threads of said jaws so that rotation of said nut moves said jaws axially in said passageways.

24. The chuck as in claim 23, wherein said body defines a bore extending radially into said body from said central bore, wherein said radial bore defines a restricted opening at said central bore, wherein said first detent includes a first ball disposed in said radial bore and a spring disposed in said radial bore so that said spring biases said first ball toward said restricted opening, and wherein the diameter of said first ball is greater than the width of said restricted opening so that said first ball extends radially into said central bore when said first ball engages said restricted opening.

25. A chuck for use with a manual or powered driver having a rotatable drive shaft, said chuck comprising:
    a generally cylindrical body having a nose section and a tail section, said tail section being rotatable with said drive shaft of said driver and said nose section having a central bore formed therein and a plurality of angularly disposed passageways formed therethrough and intersecting said axial bore, wherein said body defines a bore extending radially through said body from said central bore to an outer circumferential surface of said body;
    a generally cylindrical sleeve disposed rotatably about said body and axially moveable with respect to said body;
    a plurality of jaws slidably positioned in each of said angularly disposed passageways, each of said jaws having a jaw face formed on one side thereof;
    a nut disposed about said body in axially driving engagement with said jaws and rotatably with respect to one of said sleeve and said body so that relative rotation between said nut and said one of said sleeve and said body axially drives said jaws in said passageways;
    a pin disposed in said radial bore in operative communication with said sleeve and said central bore; and
    an elongated tool shaft having a polygonal cross section and defining a circumferential groove,
    wherein an inner circumferential surface of said sleeve defines a cam in communication with said pin so that axial movement of said sleeve to a first position drives said pin toward said central bore and axial movement of said sleeve to a second position permits movement of said pin away from said central bore,
    wherein, upon insertion of said tool shaft into said bore so that said groove is aligned with said pin and movement of said sleeve to said first position, said pin engages said groove and axially retains said tool shaft, and
    wherein, upon movement of said jaws axially in said passageways so that said jaw faces engage flat sides of said tool shaft, said jaws rotationally retain said tool shaft.

26. The chuck as in claim 25, wherein said radial bore defines a restricted opening at said central bore, wherein a ball is disposed in said radial bore having a diameter greater than the width of said restricted opening, and wherein said pin engages said ball so that said ball extends radially into said central bore when said sleeve is in said first position.

27. A chuck for use with a manual or powered driver having a rotatable drive shaft, said chuck comprising:
    a generally cylindrical body having a nose section and a tail section, said tail section being rotatable with said drive shaft of said driver and said nose section having a central bore formed therein and a plurality of angularly disposed passageways formed therethrough and intersecting said axial bore;
    a generally cylindrical sleeve disposed rotatably about said body;
    a plurality of jaws slidably positioned in each of said angularly disposed passageways, each of said jaws having a jaw face formed on one side thereof;
    a nut disposed about said body in axially driving engagement with said jaws and rotatably with respect to one of said sleeve and said body so that relative rotation between said nut and said one of said sleeve and said body axially drives said jaws in said passageways;
    a first detent extending radially into said bore, said first detent being releasable in a radially outward direction;
    an elongated tool shaft having a polygonal cross section and defining a circumferential groove;
    a spring disposed operatively between said body and said jaws so that said spring biases said jaws axially forward in said passageways;
    a second detent operatively disposed between said jaws and said body; and
    a catch, said second detent and said catch being disposed with respect to each other so that said second detent engages said catch when said jaws are at a predetermined position at which said jaws engage said flat sides of said tool shaft when said tool shaft is inserted into said central bore,
    wherein, upon insertion of said tool shaft into said bore so that said groove is aligned with said first detent, said first detent engages said groove and axially retains said tool shaft, and
    wherein, upon movement of said jaws axially in said passageways to said first position, said jaws rotationally retain said tool shaft.

28. The chuck as in claim 27, wherein said first detent is defined in at least one of said jaws.

29. The chuck as in claim 27, wherein said first detent is defined in said body.

30. The chuck as in claim 27, wherein said nut includes a driving disk slidably disposed on said body and having an external screw thread, and wherein said sleeve defines an internal screw thread that meshes with said external screw thread whereby when said sleeve is rotated with respect to said body, said jaws are moved thereby.

31. The chuck as in claim 30, wherein said second detent is disposed in one of said nut and said sleeve and said catch is disposed in the other of said sleeve and said nut.

32. The chuck as in claim 30, wherein said second detent is disposed in one of said nut and said body and said catch is disposed in the other of said nut and said body.

33. The chuck as in claim 27, wherein each of said jaws define threads thereon and wherein said nut defines threads that engage said threads of said jaws so that rotation of said nut moves said jaws axially in said passageways.

* * * * *